US009604535B2

(12) United States Patent
Yahashi et al.

(10) Patent No.: US 9,604,535 B2
(45) Date of Patent: Mar. 28, 2017

(54) VEHICLE

(75) Inventors: Hiroki Yahashi, Toyota (JP); Tsukuo Ishitoya, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 798 days.

(21) Appl. No.: 13/577,485

(22) PCT Filed: Feb. 3, 2011

(86) PCT No.: PCT/IB2011/000170
§ 371 (c)(1),
(2), (4) Date: Aug. 7, 2012

(87) PCT Pub. No.: WO2011/098875
PCT Pub. Date: Aug. 18, 2011

(65) Prior Publication Data
US 2012/0318378 A1 Dec. 20, 2012

(30) Foreign Application Priority Data
Feb. 15, 2010 (JP) .................................. 2010-030104

(51) Int. Cl.
*B60K 15/077* (2006.01)
*B60K 15/03* (2006.01)
*F17C 5/06* (2006.01)

(52) U.S. Cl.
CPC .. *B60K 15/077* (2013.01); *B60K 2015/03131* (2013.01); *F17C 5/06* (2013.01); *F17C 2270/0184* (2013.01); *Y10T 137/6416* (2015.04)

(58) Field of Classification Search
USPC ........................................ 137/255, 256, 262
See application file for complete search history.

(56) References Cited

U.S. PATENT DOCUMENTS 3,574,343 A * 4/1971 Cutler ........................... 366/142
3,844,306 A * 10/1974 Hill ............................... 137/256
(Continued)

FOREIGN PATENT DOCUMENTS

| JP | 9-72374 | 3/1997 |
| JP | 2003-97798 | 4/2003 |

(Continued)

OTHER PUBLICATIONS

International Search Report in International Application No. PCT/IB2011/000170; Mailing Date: Jul. 4, 2011.
(Continued)

*Primary Examiner* — Jessica Cahill
*Assistant Examiner* — Jonathan Waddy
(74) *Attorney, Agent, or Firm* — Finnegan, Henderson, Farabow, Garrett & Dunner, LLP (57) ABSTRACT

A vehicle (3) equipped with gas tanks (30a, 30b) has a common channel (34c) and branch channels (34a, 34b) that branch from the common channel (34c) to the gas tanks (30a, 30b), as a filling passageway (34) through which gas is supplied from an external gas station (2) to the gas tanks (30a, 30b). The gas tank (30a) is better in heat dissipation characteristic than the gas tank (30b). Only the branch channel (34a) that corresponds to the gas tank (30a) is provided with a shutoff valve (40) or a flow regulation valve (46) that is capable of restricting the amount of gas supplied to the gas tank (30a).

13 Claims, 8 Drawing Sheets

(56) References Cited

U.S. PATENT DOCUMENTS

| | | | |
|---|---|---|---|
| 6,070,610 A * | 6/2000 | Owler | F15B 21/10 137/256 |
| 6,651,701 B2 * | 11/2003 | Kuriiwa | C01B 3/0005 137/14 |
| 7,246,606 B2 * | 7/2007 | Tokumaru | F02M 25/089 123/514 |
| 7,325,561 B2 * | 2/2008 | Mathison et al. | 137/256 |
| 9,016,329 B2 * | 4/2015 | Mori | F17C 5/06 141/197 |
| 2006/0118175 A1 | 6/2006 | Mathison et al. | |
| 2007/0298313 A1 * | 12/2007 | Iida | 429/49 |
| 2008/0105310 A1 * | 5/2008 | Ogami | F17C 13/04 137/557 |
| 2008/0280174 A1 * | 11/2008 | Ogawa et al. | 429/22 |

FOREIGN PATENT DOCUMENTS

| | | | |
|---|---|---|---|
| JP | 2003269693 A | * | 9/2003 |
| JP | 2004-84808 | | 3/2004 |
| JP | 2005155869 A | * | 6/2005 |
| JP | 2005-226716 | | 8/2005 |
| JP | 2005-353346 | | 12/2005 |
| JP | 2006-269330 | | 10/2006 |
| JP | 2007-107656 | | 4/2007 |
| JP | 2007-170443 | | 7/2007 |

OTHER PUBLICATIONS

Written Opinion of the International Searching Authority in International Application No. PCT/IB2011/000170; Mailing Date: Jul. 4, 2011.
Notification of Reason(s) for Refusal in Japanese Patent Application No. 2010-030104; Drafting Date: Jan. 13, 2012.

* cited by examiner

VEHICLE

BACKGROUND OF THE INVENTION

1. Field of the Invention

The invention relates to a vehicle equipped with a plurality of gas tanks that are different in heat dissipation characteristic.

2. Description of the Related Art

An example of vehicles as mentioned above is known as a fuel cell vehicle into which hydrogen gas is filled from a hydrogen station (see Japanese Patent Application Publication No. 2005-155869 (JP-A-2005-155869)). In Japanese Patent Application Publication No. 2005-155869 (JP-A-2005-155869), because the amount of internal temperature rise in the hydrogen tank when filling of hydrogen gas varies among various hydrogen tanks, filling the tanks with hydrogen is started with filling a certain amount of hydrogen gas only into a hydrogen tank whose heat dissipation characteristic is high. After that, filling the tank that has the high heat dissipation characteristic is temporarily suspended, and the filling a tank that has a low heat dissipation characteristic is started. After filling the tank that has the low heat dissipation characteristic ends, filling the tank that has the high heat dissipation characteristic is restarted to completely fill the tank that has the high heat dissipation characteristic. This series of filling controls is performed by switching a switch valve that is provided at a branching point of a filling passageway.

According to the filling method described in Japanese Patent Application Publication No. 2005-155869 (JP-A-2005-155869), it is possible to completely fill all of the plurality of hydrogen tanks that are different in heat dissipation characteristic. However, in this filling method, it is necessary to repeat relatively short-time filling processes, and therefore efficient filling process can not be performed.

In the case when the switch valve is omitted, the hydrogen tanks are simultaneously filled with hydrogen gas. However, the SoC (state of filling, that is, the percentage of filling) of a hydrogen tank reaches 100% (a completely filled state) more quickly the tank that has higher the heat dissipation characteristic. Therefore, if the filling control of the hydrogen tanks is performed in accordance with the SoC of the hydrogen tank that has the high heat dissipation characteristic, the hydrogen tank that has the low heat dissipation characteristic will not reach the completely filled state. On the other hand, if the filling control of the hydrogen tanks is performed in accordance with the SoC of the hydrogen tank that has the low heat dissipation characteristic, there is a risk of excessive filling of the hydrogen tank that has the high heat dissipation characteristic.

SUMMARY OF THE INVENTION

The invention provides a vehicle that restrains excessive filling or shortage in filling amount of a plurality of gas tanks that vary in heat dissipation characteristic, and also increases the total state of filling (percentage of filling) of the gas tanks of the vehicle.

A first aspect of the invention relates to a vehicle. The vehicle has: a first gas tank that has a first heat dissipation characteristic; a second gas tank that has a second heat dissipation characteristic that is lower than the first heat dissipation characteristic; a common channel as a supply passageway of a gas that is supplied from an external gas station to the first and second gas tanks; and a first branch channel and a second branch channel that branch from the common channel to the first and second gas tanks, respectively. The first branch channel is provided with a flow restriction mechanism capable of restricting amount of the gas supplied to the first gas tank.

According to the foregoing aspect, when the gas is supplied to the vehicle from the gas station, the gas flows through the common channel and divides into the first and second branch channels, and is supplied to the first and second gas tanks. The amount of the gas supplied to the first gas tank can be restricted by the flow restriction mechanism. This restrains the excessive filling of the first gas tank, which is likely to quickly reach a predetermined SoC. Besides, according to the foregoing aspect, if the gas is supplied to the second gas tank when the amount of the gas supplied to the first gas tank is restricted, shortage in filling amount of the second gas tank can be restrained, so that the total state of filling can be increased in the vehicle. Furthermore, as for the flow restriction mechanism, it is not necessary to provide one on the second branch channel, so that the number of components and the cost can be reduced.

In the foregoing aspect, the flow restriction mechanism may be constructed of an orifice that is provided in a piping that constitutes the first branch channel, but may also be constructed of a shutoff valve or a flow regulation valve.

In the case where the flow restriction mechanism is constructed of a shutoff valve, the gas supply to the first gas tank can be suspended, for example, when the SoC of the first gas tank, whose heat dissipation characteristic is high, reaches a predetermined value (e.g., 100%). Therefore, the excessive filling of the first gas tank can be prevented. Besides, if the gas supply to the second gas tank is continued after that, shortage in filling amount of the second gas tank can be restrained.

In the foregoing aspect, the vehicle may further include a vehicle-side controller that controls opening and closing of the shutoff valve. When the vehicle is supplied with the gas from the gas station, the vehicle-side controller may permit the gas to be supplied to the first and second gas tanks while the shutoff valve is opened, and then, after supply of a predetermined amount of the gas to the first gas tank is completed, the vehicle-side controller may close the shutoff valve to permit the gas to be supplied only to the second gas tank among the first and second gas tanks. According to this construction, excessive filling of the first gas tank and shortage in filling amount of the second gas tank can be restrained by simple control of the shutoff valve.

In the foregoing aspect, the vehicle may further include a vehicle-side controller that controls opening and closing of the shutoff valve. If a user designates a filling amount or a budget for filling when the gas is supplied from the gas station into the vehicle, the vehicle-side controller may calculate states of filling of the first and second gas tanks that correspond to the filling amount or the budget for filling, and the vehicle-side controller may permit the gas to be supplied to the first and second gas tanks so that filling of the first and second gas tanks is performed according to the calculated states of filling.

In the foregoing aspect, the vehicle may further include a first detector that detects a state quantity regarding an interior of the first gas tank. The vehicle-side controller may use information detected by the first detector as an index for determining whether or not the supply of the predetermined amount of the gas has been completed. According to this construction, the use of actually detected information of the state quantity regarding the interior of the first gas tank makes it possible to appropriately determine whether or not the SoC of the first gas tank has reached a predetermined value.

In the foregoing construction, the vehicle-side controller may make the determination as to whether or not the supply of the predetermined amount of the gas has been completed.

In the foregoing construction, the vehicle may further include a transmitter that transfers information detected by the first detector to a receiver that is provided at the gas station by communication. According to this construction, it is possible to achieve the state quantity regarding the interior of the first gas tank at the gas station side. This makes it possible for the gas station side to determine whether or not to continue supplying the gas to the first gas tank.

In the foregoing construction, the vehicle may further include a second detector that detects a state quantity regarding an interior of the second gas tank. The transmitter may also transfer information detected by the second detector to the receiver provided at the gas station side by signal communication. According to this construction, it becomes possible to appropriately determine whether or not the SoC of the second gas tank has reached the predetermined value, and it also becomes possible for the gas station side to achieve the state quantity regarding the interior of the second gas tank.

In the foregoing construction, timing at which the shutoff valve is operated and stopped may be controlled by timing means. According to this construction, when the gas is supplied from the gas station, the driving of the shutoff valve can be appropriately controlled.

In the case where the flow restriction mechanism is constructed of a flow regulation valve, a control can be performed in such a manner that the amount of the gas supplied into the first gas tank is reduced, for example, beginning at the start of supplying the gas. Therefore, during the gas supply, the SoCs of the first and second gas tanks can be made substantially equal to each other, so that it is possible to restrain excessive filling and shortage in filling amount of the two gas tanks.

In the foregoing construction, the vehicle may further include a vehicle-side controller that controls opening degree of the flow regulation valve. The vehicle-side controller may control the opening degree of the flow regulation valve so that the states of filling in the first and second gas tanks are substantially equal to each other while the gas is supplied from the gas station. According to this construction, excessive filling and shortage in filling amount of the two gas tanks can be restrained by controlling the flow regulation valve electrically.

In the foregoing construction, timing at which the flow regulation valve is operated and stopped may be controlled by timing means.

In the foregoing construction, the flow regulation valve may be a mechanical valve whose opening degree is controlled so that the states of filling of the first and second gas tanks are substantially equal to each other while the gas is supplied from the gas station. According to this construction, it is unnecessary to electrically control the flow regulation valve, and therefore it is possible to curb the electric power consumption of the vehicle during the gas supply from the gas station.

In the foregoing construction, the vehicle may further include: a fuel cell that generates electricity using the gas filled in the gas tanks; and a battery that stores the electricity generated in the fuel cell. The flow regulation valve may be operated by using the electricity stored in the battery when the gas tanks are being charged.

BRIEF DESCRIPTION OF THE DRAWINGS

The features, advantages, and technical and industrial significance of this invention will be described below with reference to the accompanying drawings, in which like numerals denote like elements, and wherein.

DETAILED DESCRIPTION OF EMBODIMENTS

Vehicles in accordance with embodiments of the invention will be described hereinafter with reference to the drawings. The following description will be made in conjunction with an example of a fuel cell operated vehicle in which a fuel cell system is mounted. The fuel cell system includes fuel cells that generate electricity by electrochemical reaction between a fuel gas (e.g., hydrogen gas) and an oxidizing gas (e.g., air), and the like. Besides, filling of hydrogen gas is one manner of supplying hydrogen gas from the gas station to a gas tank of the vehicle.

Figure 1:
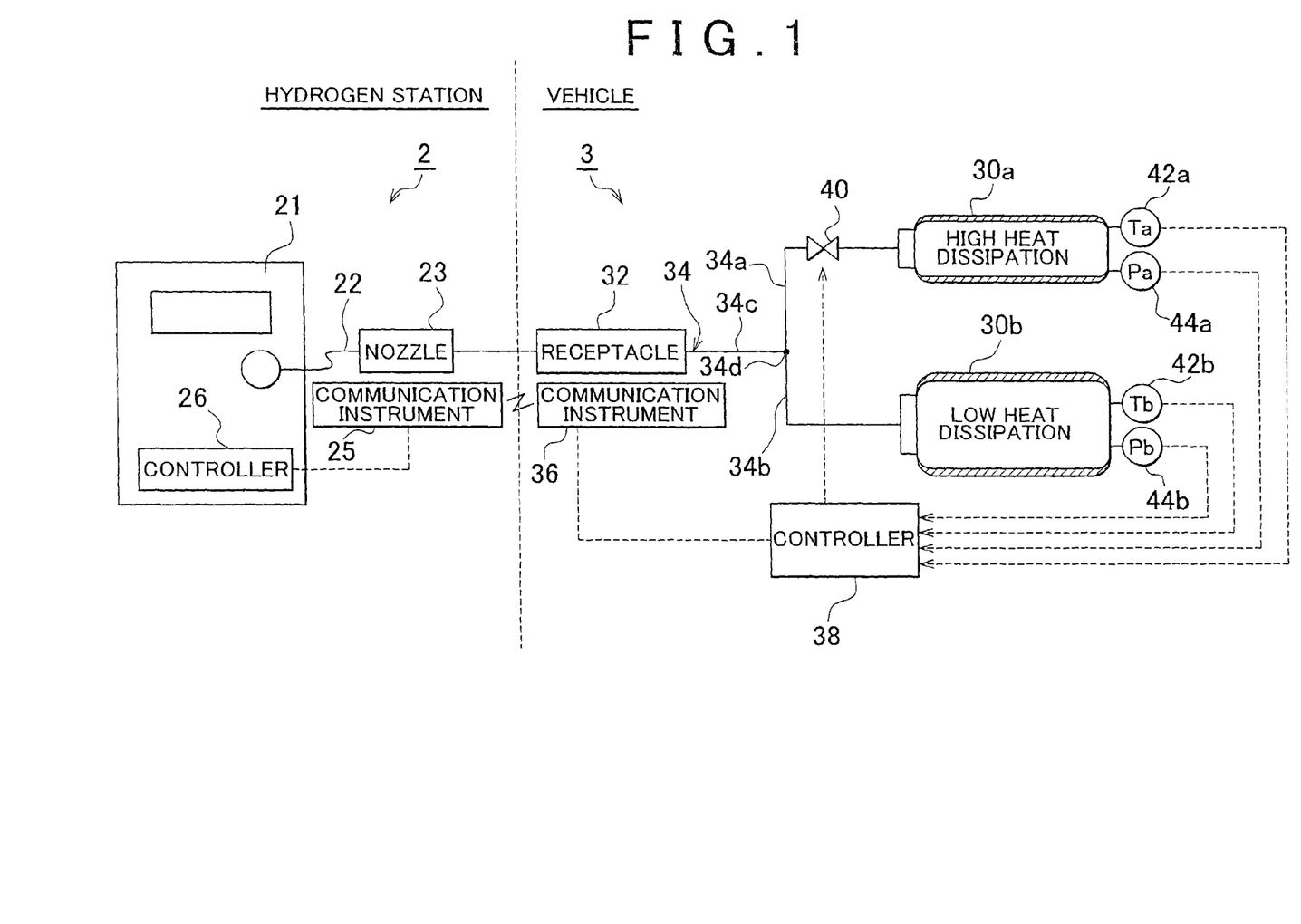
FIG. 1 is a construction diagram showing a vehicle in accordance with a first embodiment of the invention, together with a gas station.

[First Embodiment] As shown in FIG. 1, the gas filling system includes, for example, a hydrogen station 2 as a gas station, and a vehicle 3 that travels by using hydrogen gas.

The hydrogen station 2 includes a dispenser 21 that sends out hydrogen gas. A filling hose 22 is connected to the dispenser 21. A filling nozzle 23, also called filling coupling, is attached to an end of the filling hose 22. The filling nozzle 23 is connected to the vehicle 3 when filling hydrogen gas. A communication instrument 25 that sends and receives various kinds of information to and from the vehicle 3 is provided at a distal end portion of the filling nozzle 23. The information received by the communication instrument 25 is sent to a controller 26. The controller 26 is constructed as a microcomputer that includes a CPU, a ROM and a RAM. The controller 26 controls the flow-rate of filling or the amount of filling of hydrogen gas into the vehicle 3 by controlling various appliances and the like that are provided at the hydrogen station 2, on the basis of the information about the vehicle 3 side which is received by the controller 26 from the communication instrument 25. Besides, using the communication instrument 25, the controller 26 sends information available at the hydrogen station 2, to the vehicle 3 side.

The vehicle 3 includes two gas tanks 30a and 30b, a receptacle 32, a supply passageway 34, a communication instrument 36, and a controller 38. Hydrogen gas in the gas tanks 30a and 30b is supplied to a fuel cell through a supply piping (not shown). The gas tanks 30a and 30b are connected in parallel to the receptacle 32 by the supply passageway 34. Hydrogen gas is supplied to the gas tanks 30a and 30b from the hydrogen station 2 via the receptacle 32 and the supply passageway 34.

The receptacle 32 is a portion to which the filling nozzle 23 is connected when filling hydrogen, and is provided, for example, in a lidded box of the vehicle 3. The communication instrument 36 is provided near the receptacle 32. While the receptacle 32 and the filling nozzle 23 are connected, communication between the communication instrument 25 and the communication instrument 36 is permitted. The communication instrument 36 is provided for the vehicle to communicate with the hydrogen station 2, and has a communication interface, for example, a wireless communication such as infrared communication or the like. Incidentally, the receptacle 32 has a built-in check valve that prevents reverse flow of hydrogen gas outside, or the like.

The supply passageway 34 constitutes a flow channel for flowing hydrogen gas from the receptacle 32 to the gas tanks 30a and 30b, and bifurcates at an intermediate point along the path. The supply passageway 34 has a branch channel 34a for the gas tank 30a, a branch channel 34b for the gas tank 30b, and a common channel 34c that is provided upstream of the branch channels 34a and 34b. In the flow channel of hydrogen gas from the receptacle 32 to the gas tank 30a, the common channel 34c is a portion of the supply passageway 34 that is shared by the gas tanks 30a and 30b. The branch channels 34a and 34b are flow channels that extend from a downstream end 34d of the common channel 34c (i.e., the bifurcation point) to the corresponding gas tanks 30a and 30b. The foregoing branch channels 34a and 34b can be constructed of a gas piping that is provided outside the gas tanks 30a and 30b, and flow channel portions provided in valve assemblies (not shown) that are attached to opening portions of the gas tanks 30a and 30b, respectively, so as to communicate with the gas piping.

In the supply passageway 34, only the branch channel 34a is provided with a shutoff valve 40 whose opening and closing is controlled by the controller 38. Although the shutoff valve 40 is driven, for example, by electromagnetic force, in this embodiment, which is not restrictive. The shutoff valve 40 may be of various other types.

The gas tanks 30a and 30b are a hydrogen gas supply source for the fuel cell, for example, high-pressure tanks that are capable of holding hydrogen gas at, for example, 35 MPa or 70 MPa. The gas tanks 30a and 30b of this kind each has shoulder portions at both ends of a barrel portion. At least one of the two shoulder portions has an opening portion to which a valve assembly is attached. The gas tanks 30a and 30b have a layered structure that has a liner layer at an inner side, and a reinforcement layer, such as an FRP layer or the like, at an outer side.

It is to be noted herein that the heat dissipation characteristic of gas tanks generally varies depending on specifications of the gas tanks, such as the materials that form the gas tanks, the admeasurements of the gas tanks (length, diameter, capacity, surface area, etc.), etc. For example, in the case where aluminum is used for a liner layer of a gas tank, the heat dissipation characteristic is better than in the case where a resin (polyethylene or the like) is used for the liner layer. Besides, the heat dissipation characteristic of gas tanks also varies depending on the characteristic and the compounding proportion of the resin in the liner layer. Furthermore, the heat dissipation characteristic of gas tanks also varies depending on the ratio of the length to the diameter, the ratio of capacity to surface area, etc. In the case where the heat dissipation characteristic of a gas tank is high, the rate of temperature rise (amount of temperature rise) and the rate of pressure rise (amount of pressure rise) in the gas tank which are caused when filling of the gas tank are made lower than in the case where the heat dissipation characteristic of the gas tank is not high.

The gas tanks 30a and 30b in this embodiment is different from each other in heat dissipation characteristic. Specifically, the heat dissipation characteristic of the gas tank 30a is higher. For example, the liner layer of the gas tank 30a is made of aluminum, and the liner layer of the gas tank 30b is made of a resin. In this embodiment, the gas tank 30b is larger in diameter than the gas tank 30a, and is provided with a thick layer of FRP for securing a strength required for a large-diameter tank, and therefore has a lower heat dissipation characteristic than the gas tank 30a.

Temperature sensors 42a and 42b are disposed inside the gas tanks 30a and 30b, respectively, and detect temperatures that reflect the temperatures of hydrogen gas in the gas tanks 30a and 30b (hereinafter, referred to as "tank temperature Ta" and "tank temperature Tb"), respectively. The temperature sensors 42a and 42b are provided, for example, in the flow channel portions in the foregoing valve assemblies. Pressure sensors 44a and 44b detect pressures that reflect the pressures of hydrogen gas in the gas tanks 30a and 30b (hereinafter, referred to as "tank pressure Pa" and "tank pressure Pb"), respectively. The pressure sensors 44a and 44b may be disposed inside the gas tanks 30a and 30b, respectively, and may also be disposed in the foregoing gas piping portions that are provided immediately upstream of the gas tanks 30a and 30b.

Incidentally, in this embodiment, at least one of the temperature sensor 42a and the pressure sensor 44a can correspond to a "first detector" in the invention. Similarly, at least one of the temperature sensor 42b and the pressure sensor 44b can correspond to a "second detector" in the invention.

The controller 38 is constructed as a microcomputer that has therein a CPU, a ROM and a RAM, and controls the vehicle 3. The CPU executes desired computations according to control programs, and performs various processes and controls such as the opening and closing of the shutoff valve 40. The ROM stores control programs and control data that the CPU processes, and the RAM is used mainly as a working space for control processes. The controller 38 is connected to the communication instrument 36, the temperature sensors 42a and 42b, the pressure sensors 44a and 44b, etc., and sends information available at the vehicle 3 to the hydrogen station 2 through the use of the communication instrument 36. Examples of the information sent from the controller 38 to the hydrogen station 2 are detection information about the tank temperature Ta and the tank pressure Pa that show state quantities regarding the interior of the gas tank 30a, and detection information about the tank temperature Tb and the tank pressure Pb that show state quantities regarding the interior of the gas tank 30b.

Next, with reference to FIG. 2, a procedure of filling hydrogen gas to the vehicle 3 of the gas filling system will be described. Incidentally, this procedure is performed as appropriate by the controller 26 and the controller 38.

In step S1, the filling is started when the dispenser 21 is actuated during the state in which the filling nozzle 23 is connected to the receptacle 32. At the start of the filling, the shutoff valve 40 is open, so that the hydrogen gas discharged from the filling nozzle 23 is supplied to both the gas tanks 30a and 30b.

During the filling of hydrogen, the SoC of the gas tank 30a which has better heat dissipation characteristic is monitored (step S2). The SoC herein refers to the filling percentage of hydrogen gas in the gas tank, and is calculated on the basis of the gas density. Concretely, the SoC of the gas tank is calculated through the use of a function of the density of the gas whose parameters include the temperature and the pressure of the hydrogen gas in the gas tank (i.e., the tank temperature and the tank pressure).

Therefore, during the filling in step S2, the tank temperature Ta and the tank pressure Pa of the gas tank 30a are input as appropriate (e.g., at every several seconds), and the input information is temporarily stored in the controller 38, for example in the RAM, and the input information is then sent from the communication instrument 36 to the communication instrument 25. Because of this, the controller 26 at the hydrogen station 2 side achieves the tank temperature Ta and the tank pressure Pa during the filling as appropriate, and calculates the SoC of the gas tank 30a. Thus, the SoC of the gas tank 30a is monitored. During the filling of hydrogen, the tank temperature Ta and the tank pressure Pa are looked up in a filling flow-rate map, and a control is performed to achieve a predetermined filling flow-rate.

Until the SoC of the gas tank 30a that is being monitored reaches 100% (i.e., a completely filled state), the filling of hydrogen gas into the gas tanks 30a and 30b is performed (NO in step S3, and then step S4). When the SoC of the gas tank 30a reaches 100% (YES in step S3), the shutoff valve 40 is closed according to a command from the controller 38 (step S5). Because of this, the supply of hydrogen gas into the gas tank 30a is terminated, and the supply of hydrogen gas into the gas tank 30b is continued.

Next, the SoC monitoring object is changed from the gas tank 30a to the gas tank 30b, and it is determined whether or not the SoC of the gas tank 30b has reached 100% (step S6). This determination process is performed when appropriate by calculating the SoC of the gas tank 30b on the basis of the tank temperature Tb and the tank pressure Pb. The calculation of the SoC can be performed as in the case of the gas tank 30a, that is, as the controller 38 inputs the tank temperature Tb and the tank pressure Pb and then transfers the input information to the controller 26 through the use of communication.

Then, until the SoC of the gas tank 30b that is being monitored reaches 100%, the filling of the hydrogen gas into the gas tank 30b is continued (NO in step S6, and then step S7). When the SoC of the gas tank 30b reaches 100% (YES in step S6), the supply of hydrogen gas from the hydrogen station 2 to the vehicle 3 is terminated, and a series of filling processes is ended (step S8).

Figure 3A:
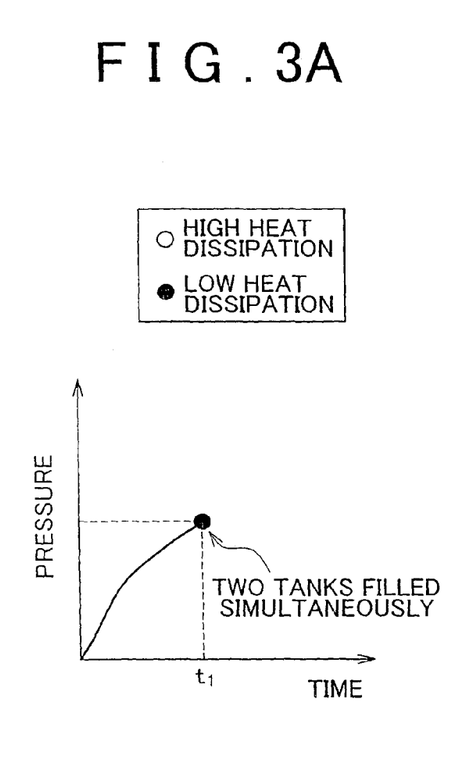
FIG. 3A to FIG. 3C are diagrams showing relationships of tank pressure, tank temperature and SoC of a tank with filling time of a comparative example, when the filling is controlled with reference to a gas tank whose heat dissipation characteristic is higher.
Figure 3B:
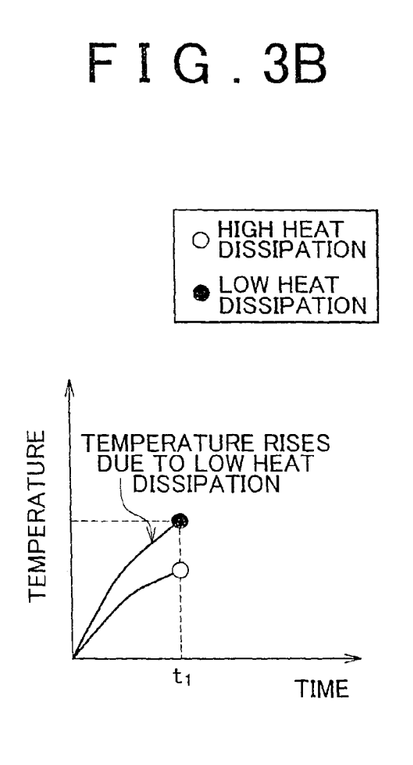
Figure 3C:
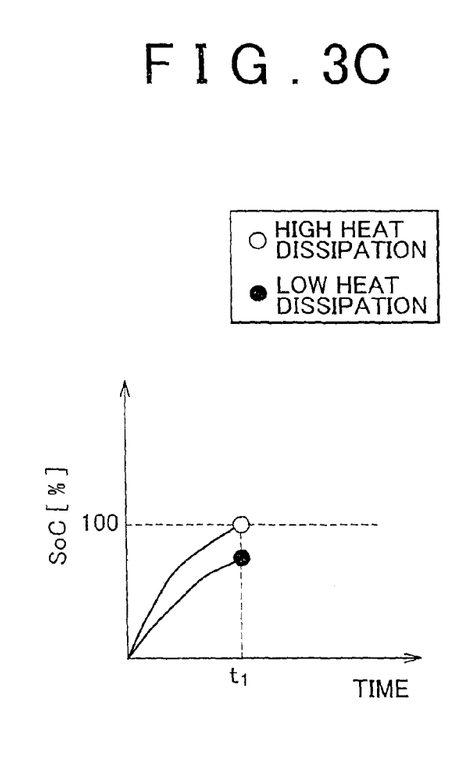
Figure 4A:
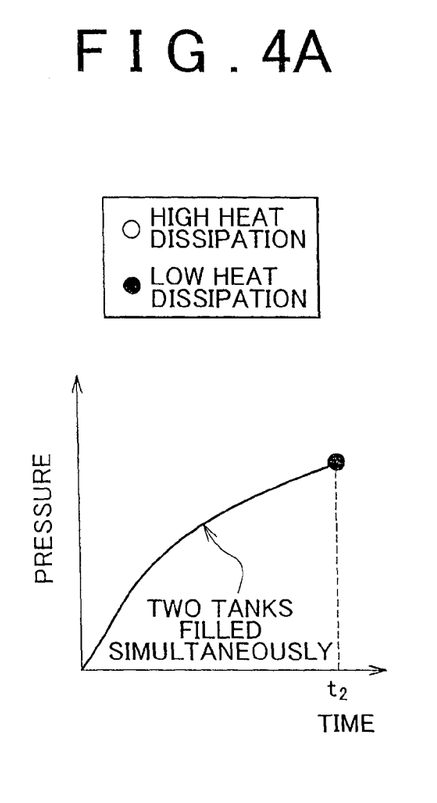
FIG. 4A to FIG. 4C are diagrams showing relationships of tank pressure, tank temperature and SoC of the tank with filling time of the comparative example, when the filling is controlled with reference to a gas tank whose heat dissipation characteristic is lower.
Figure 4B:
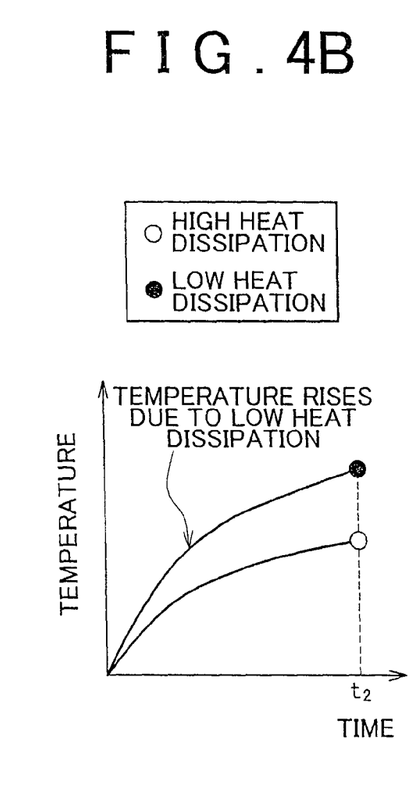
Figure 4C:
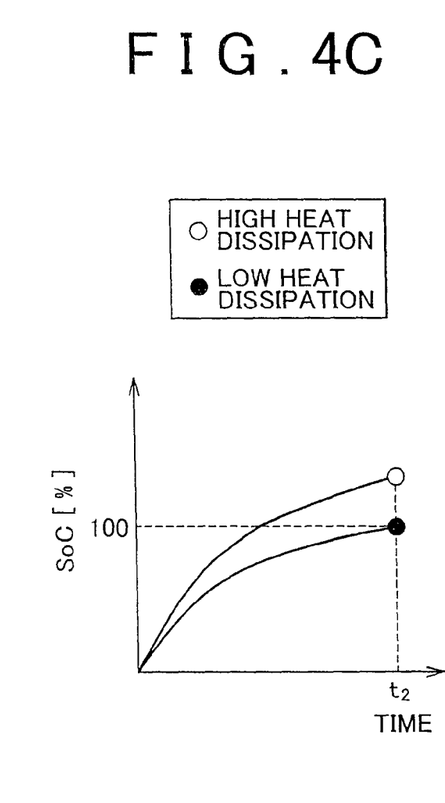

Operation and effects of the foregoing embodiment will be described in comparison with cases shown in FIGS. 3A to 3C and 4A to 4C. FIGS. 3A to 3C and FIGS. 4A to 4C all relate to cases where hydrogen gas is filled into a vehicle 3 that is not equipped with the shutoff valve 40 shown in FIG. 1. FIGS. 3A to 3C relate to cases where the filling is controlled with reference to the gas tank 30a, whose heat dissipation characteristic is high, and FIGS. 4A to 4C relate to cases where the filling is controlled with reference to the gas tank 30b, whose heat dissipation characteristic is low.

As shown in FIG. 3B, the gas tank 30a that has the high heat dissipation characteristic experiences smaller rise in temperature during the filling than the gas tank 30b that has the low heat dissipation characteristic. Therefore, as shown in FIG. 3C, in a stage where a certain amount of time has elapsed from the start of the filling, the gas tank 30a that has the high heat dissipation characteristic has higher SoC. Therefore, if the filling is controlled with reference to the gas tank 30a that has the high heat dissipation characteristic, the SoC of the gas tank 30a reaches 100% whereas the SoC of the gas tank 30b does not reach 100%, but is short in the filling amount (see FIG. 3C). On the other hand, if the filling is controlled with reference to the gas tank 30b that has the low heat dissipation characteristic, the SoC of the gas tank 30b reaches 100% but the SoC of the gas tank 30a exceeds 100%, and becomes excessively filled (see FIG. 4C). Incidentally, the time $t_1$ shown in FIGS. 3A to 3C is shorter than the time $t_2$ shown in FIGS. 4A to 4C.

Figure 5A:
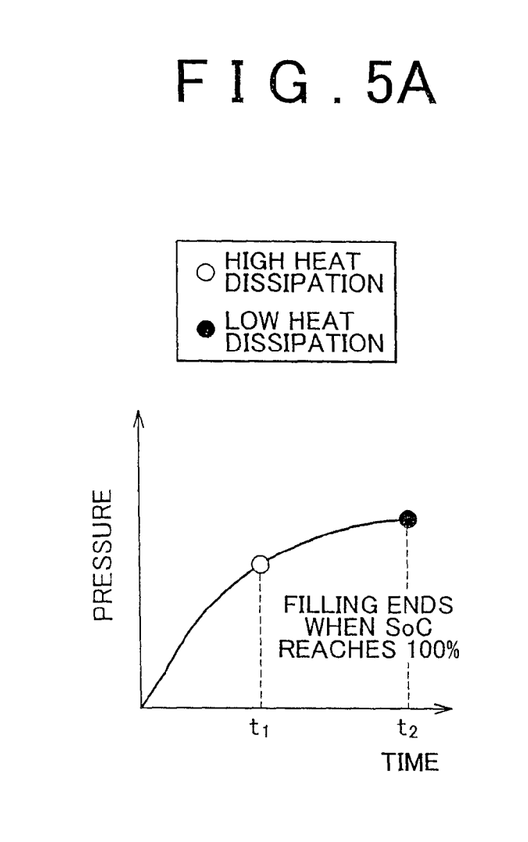
FIG. 5A to FIG. 5C are diagrams showing relationships of tank pressure, tank temperature and SoC of a tank with filling time when a filling control in accordance with the first embodiment is performed.
Figure 5B:
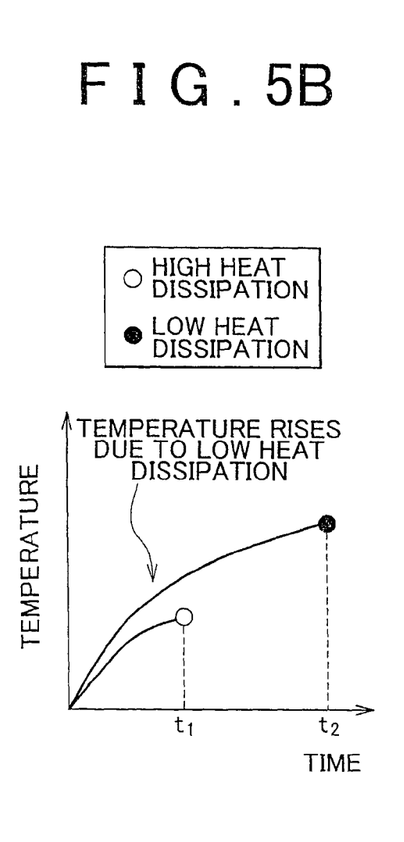
Figure 5C:
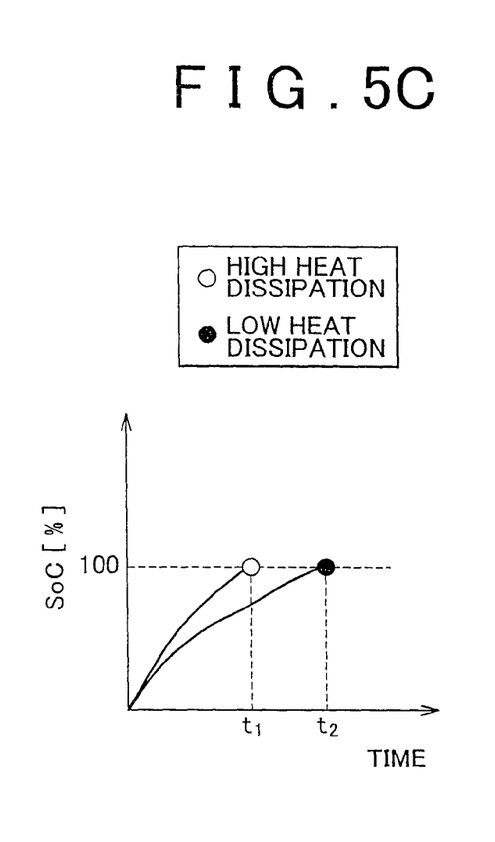

On the other hand, according to the embodiment, the filling of hydrogen is performed as shown in FIGS. 5A to 5C. Concretely, the filling is firstly controlled with reference to the gas tank 30a that has the high heat dissipation characteristic. At the time $t_1$ when the SoC of the gas tank 30a reaches 100%, the filling to the gas tank 30a is suspended (see steps S1 to S5 in FIG. 2). After that, the filling is controlled with reference to the gas tank 30b that has the low heat dissipation characteristic. At the time $t_2$ when the SoC of the gas tank 30b reaches 100%, the filling to the gas tank 30b is terminated (see steps S6 to S8 in FIG. 2). Therefore, according to the embodiment, both the gas tanks 30a and 30b can be completely filled, and excessive filling and shortage in filling amount of the gas tanks can be prevented.

In particular, in the embodiment, the provision of the shutoff valve 40 makes it possible to continue the filling to the gas tank 30b when the gas tank 30a is completely filled. Therefore, in the entire vehicle 3, the filling percentage and the filling amount of hydrogen gas can be increased. Besides, since the shutoff valve 40 is provided only on the gas tank 30a side, the number of component parts and the cost can be made less than in the case where shutoff valves are provided separately for individual gas tanks. Furthermore, since the shutoff valve 40 is used as a flow control mechanism for restricting the amount of hydrogen gas supplied to the gas tank 30a, the flow restriction mechanism is made simple as compared with the case where the flow restriction mechanism is constructed of the piping of the branch channel 34a (e.g., through such tuning as to constrict a flow channel).

Besides, as for the indexes for the determination as to whether or not the SoC of the gas tank 30a or 30b has reached 100%, that is, the determination as to whether or not the supply of a predetermined amount has been completed (e.g., steps S3 and S6), the tank temperature Ta and the tank pressure Pa during the filling are used for the gas tank 30a, and the tank temperature Tb and the tank pressure Pb during the filling are used for the gas tank 30b. Therefore, the SoC is accurately calculated separately for each of the gas tanks 30a and 30b that differ from each other in the SoC during the filling, and desired filling amounts are appropriately filled into the tanks.

Next, modifications of the first embodiment will be described. The following modifications are applicable to each other.

[First Modification] The SoC of the gas tanks 30*a* and 30*b* that are filled according to the procedure shown in FIG. 2 does not need to be 100%, but may be a predetermined value below 100%. For example, in the case where at the time of filling, a user designates a filling amount or a budget for the filling, the SoC that corresponds to the filling amount or the budget for the filling is calculated separately for each of the gas tanks 30*a* and 30*b*, and the filling into the gas tanks 30*a* and 30*b* is performed so as to correspond to the calculated SoCs of the tanks 30*a* and 30*b*. Besides, the SoCs of the gas tanks 30*a* and 30*b* that are filled according to the procedure shown in FIG. 2 do not need to be equal to each other. For example, the SoCs of the tanks 30*a* and 30*b* may be calculated by the determination of whether or not the SoC of the gas tank 30*a* is greater than 90% in step S3 in FIG. 2, and the subsequent determination of whether or not the SoC of the gas tank 30*b* is greater than 80% in step S6.

[Second Modification] The number of gas tanks is not limited to two as described in the foregoing constructions, but may also be three or more. For example, in the case where three gas tanks that have different heat dissipation characteristic from each other are connected in parallel to the receptacle 32, it suffices that the branch channels corresponding to the gas tanks of the first and second highest heat dissipation characteristics are provided with shutoff valves, and that the shutoff valves are closed in such a sequence that the SoCs of the gas tanks reach 100% in the descending order of their heat dissipation characteristics. In another example, it is also permissible to adopt a construction in which two gas tanks have the same heat dissipation characteristic and one or more other gas tanks have another or other heat dissipation characteristics. In this example case, too, it suffices that one or more branch channels corresponding to one or more gas tanks of high heat dissipation characteristic are provided with one or more shutoff valves, and that substantially the same control as described above is performed.

Figure 2:
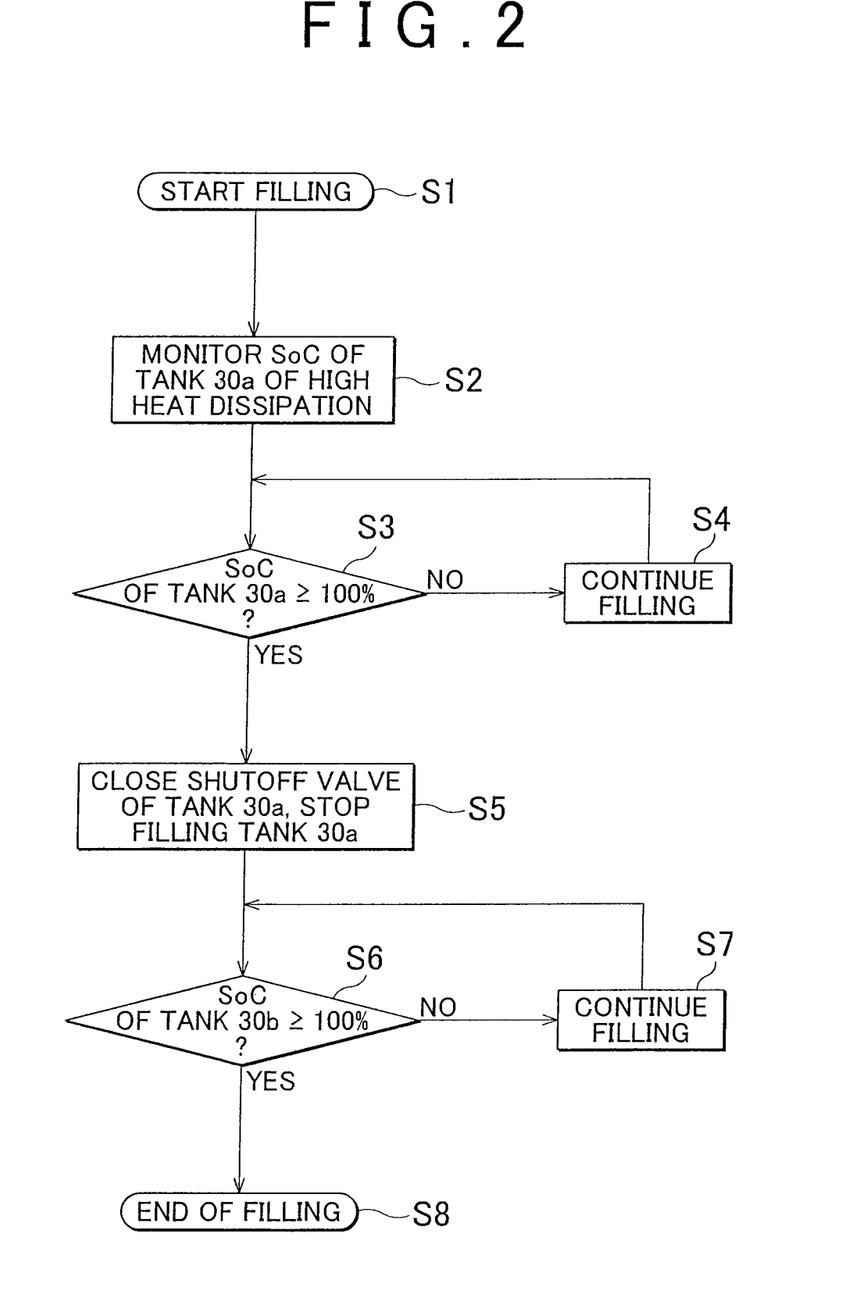
FIG. 2 is a flowchart showing a filling procedure performed for the vehicle in accordance with the first embodiment.

[Third Modification] The monitoring process (calculation of SoC) shown in FIG. 2 may also be performed by the controller 38 at the vehicle 3 side instead of the controller 26 at the hydrogen station 2 side. For example, the monitoring in step S2 in FIG. 2 may be carried out in the controller 38 by calculating the SoC of the gas tank 30*a* as appropriate on the basis of the tank temperature Ta and the tank pressure Pa that are temporarily stored. Besides, the determination as to whether or not the SoC has achieved 100% with respect to the gas tanks 30*a* and 30*b* (steps S3 and S5 in FIG. 2) may also be made by the controller 38.

Figure 6:
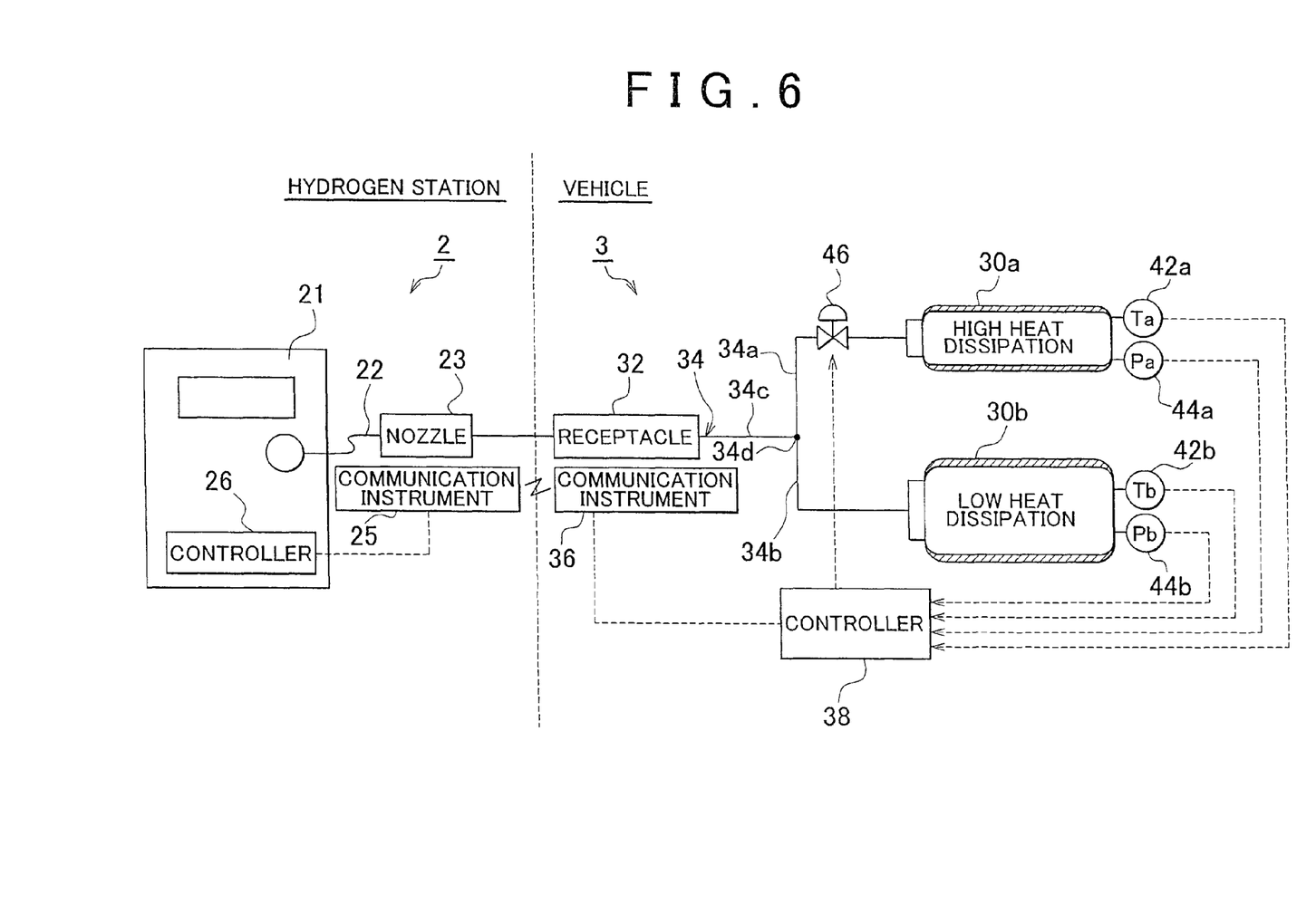
FIG. 6 is a construction diagram showing a vehicle in accordance with a second embodiment of the invention, together with a gas station.

[Second Embodiment] Next, with reference to FIG. 6, a vehicle 3 in accordance with a second embodiment will be described. The second embodiment is different from the first embodiment in that a flow regulation valve 46 is used instead of the shutoff valve 40 as a flow control mechanism for restricting the amount of hydrogen gas supplied to the gas tank 30*a*. In other respects, the configuration of the second embodiment is the same as the first embodiment, therefore the components that are the same as those of the first embodiment are denoted by the same reference characters, and will not be redundantly described.

The opening degree of the flow regulation valve 46 is controlled by the controller 38 so as to reduce the amount of flow of hydrogen gas to the gas tank 30*a*. The flow regulation valve 46 is operated by, for example, an electromagnetic force in this embodiment, but is not limited to this. That is, various other types of flow regulation valves can also be used. The opening degree of the flow regulation valve 46 is controlled by controlling the position of a valve body relative to a valve seat via a step motor.

Figure 7A:
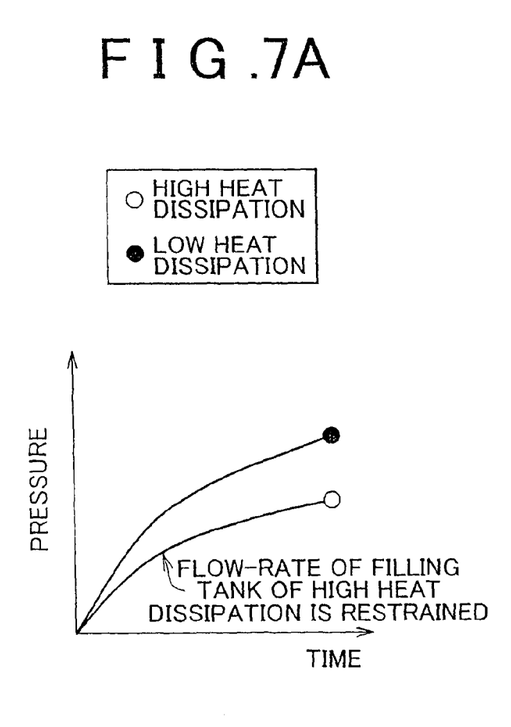
FIG. 7A to FIG. 7C are diagrams showing relationships of tank pressure, tank temperature and SoC of a tank with filling time when a filling control in accordance with the second embodiment is performed.
Figure 7B:
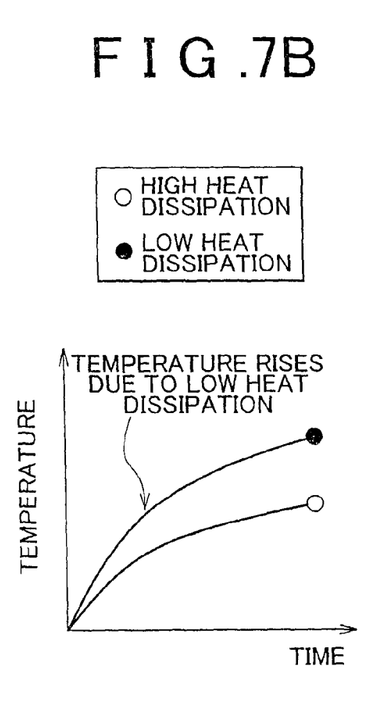
Figure 7C:
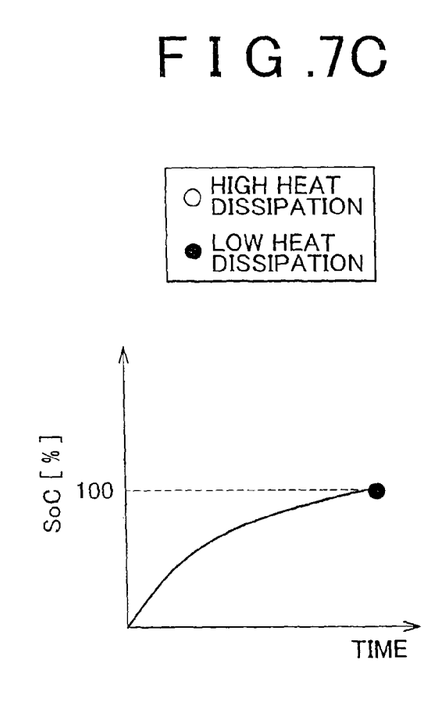

In this embodiment, as shown in FIG. 7C, the opening degree of the flow regulation valve 46 is controlled by the controller 38 so that the SoCs of the gas tanks 30*a* and 30*b* are substantially equal to each other during the supply of hydrogen gas from the hydrogen station 2 to the vehicle 3. Concretely, from the start time of filling, the opening degree of the flow regulation valve 46 is controlled to fill hydrogen gas into the gas tanks 30*a* and 30*b* so that the SoCs of the two tanks are substantially equal to each other. In the filling performed in this manner, the pressure rise in the gas tank 30*a* is made less than the pressure rise in the gas tank 30*b* as shown in FIG. 7A, and the pressure rise in the gas tank 30*a* is also made less than the pressure rise in the gas tank 30*a* in the case shown in FIG. 5.

Therefore, according to the embodiment, the SoCs of the gas tanks 30*a* and 30*b* can be held substantially equal to each other from the start of filling until the end of filling. Then, if the filling is ended when the SoCs of the two tanks reach a desired value (e.g., 100%), the SoCs of the gas tanks 30*a* and 30*b* can be made substantially equal to each other, so that excessive filling and shortage in filling amount can be restrained. Besides, since the flow regulation valve 46 is provided only on the gas tank 30*a* side, the number of component parts and the cost can be reduced.

Incidentally, in the second embodiment, the SoCs of the gas tanks 30*a* and 30*b* may also be monitored on the basis of the tank temperatures Ta and Tb and the tank pressures Pa and Pb of the two tanks in order to keep the SoCs thereof substantially equal to each other. In this case, it suffices that the SoCs of the two tanks are monitored by one of the controllers 26 and 38.

As other forms of the second embodiment, it is also possible to apply the second modification of the first embodiment to the second embodiment. For example, in the case where three gas tanks different from each other in heat dissipation characteristic are connected in parallel to the receptacle 32, flow regulation valves are provided on branch channels that correspond to the gas tanks of the first and second highest heat dissipation characteristics, and the opening degrees of the flow regulation valves are controlled so that the SoCs of all the gas tanks become equal.

Besides, according to another form of the embodiment, the flow regulation valve 46 may also be of a mechanical type, instead of being of an electrically controlled type. For example, a secondary pressure on the downstream side of the flow regulation valve 46 is introduced into a pressure chamber of the flow regulation valve 46, and the introduced secondary pressure moves a diaphragm, so that a valve body connected to the diaphragm is moved relative to the valve seat. Thus, the opening degree of the flow regulation valve 46 may be controlled so that the SoCs of the gas tanks 30*a* and 30*b* are substantially equal to each other while the SoCs thereof change (or increase) during filling. According to the mechanical-type flow regulation valve 46 as described above, the electric power for driving the flow regulation valve 46 is not needed, so that the electric power consumption of the vehicle 3 during the filling can be restrained.

[Third Embodiment] Next, an electric power system of a fuel cell operated vehicle in accordance with a third embodiment that is applicable to the first and second embodiments will be described with reference to FIG. 8.

Figure 8:
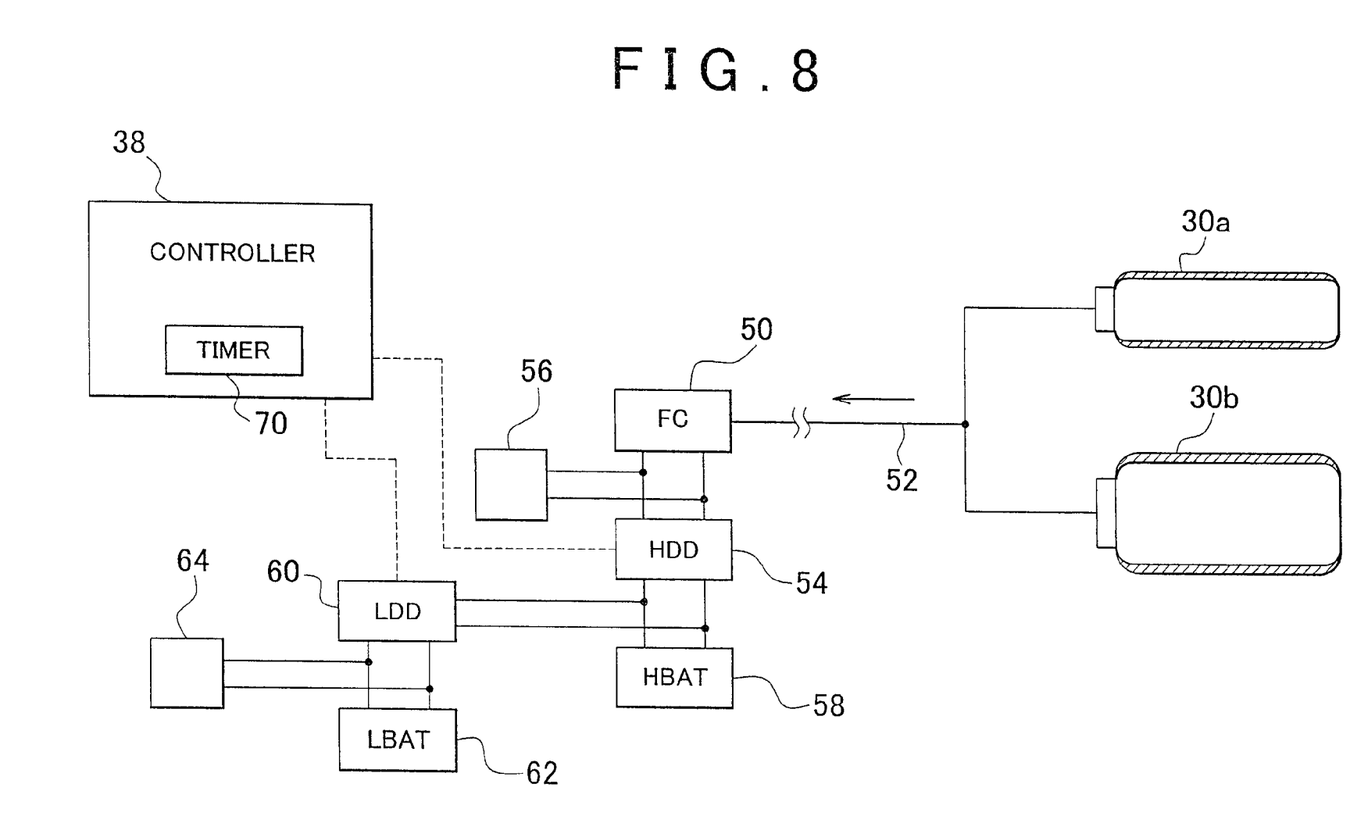
FIG. 8 is a construction diagram of a fuel cell operated vehicle in accordance with a third embodiment of the invention, which is applicable to the first and second embodiments, showing an electric power system as a central element of the illustration.

As shown in FIG. 8, the gas tanks 30*a* and 30*b* are provided with a supply piping 52 that supplies hydrogen gas to a fuel cell 50, and that is a system different from the supply passageway 34. A high-voltage DC/DC converter 54 that controls the output voltage of the fuel cell 50 is connected to the fuel cell 50. Various high-voltage accessories 56 that are used for the operation of the fuel cell 50 are electrically connected between the fuel cell 50 and the high-voltage DC/DC converter 54. The high-voltage accessories 56 are accessories for high voltage (e.g., a voltage above 12 V), for example, an air compressor that pressure-feeds an oxidizing gas to the fuel cell 50, a hydrogen pump that supplies a hydrogen off-gas to the fuel cell 50 in a circulating manner. An electricity storage device 58 is a chargeable-dischargeable secondary cell that functions as a high-voltage electricity storage device. The electricity storage device 58 is connected to, for example, a traction motor of the vehicle 3, via the high-voltage DC/DC converter 54, in parallel with the fuel cell 50.

A low-voltage DC/DC converter 60 is electrically connected between the high-voltage DC/DC converter 54 and the electricity storage device 58. The low-voltage DC/DC converter 60 reduces the voltage of a part of the direct-current power at a high-voltage circuit side, and supplies the voltage-reduced direct-current power to a low-voltage circuit side. The voltage-reduced direct-current power is partially used to charge a low-voltage battery 62, and is partially used as power to drive low-voltage accessories 64. The low-voltage battery 62 functions as an electricity storage device for low voltage (e.g., 12 V), and is a secondary cell that is represented by, for example, a nickel metal hydride cell, or a lithium ion cell. The low-voltage accessories 64 are various appliances that are driven at low voltage, and are different from the high-voltage accessories 56. What are regarded as the low-voltage accessories 64 are, for example, the foregoing temperature sensors 42a and 42b, the pressure sensors 44a and 44b, the communication instrument 36, etc., as well as the shutoff valve 40 shown in FIG. 1, the electric type flow regulation valve 46 shown in FIG. 5, and the like. The low-voltage accessories 64 and the controller 38 are also driven by electric power supplied from the low-voltage battery 62 as an electric power supply source. For example, while the vehicle 3 is in an ignition-off state (hereinafter, referred to as "IGOFF"), the fuel cell 50 does not generate electricity, and therefore the power for the low-voltage accessories 64 and the controller 38 is supplied from the low-voltage battery 62. The controller 38 is electrically connected to the high-voltage DC/DC converter 54, the low-voltage DC/DC converter 60, etc. The controller 38 is provided with a timer 70 for measuring various amounts of time. The timer 70 may also be provided separately from the controller 38.

In the case where hydrogen gas is filled into the vehicle 3 in accordance with the first and second embodiments, the vehicle 3 is turned into the ignition-off state IGOFF. Therefore, during filling of hydrogen, the low-voltage battery 62 supplies electric power to the low-voltage accessories 64 (that include the shutoff valve 40 or the flow regulation valve 46) and the controller 38 so that the control of the shutoff valve 40 or the flow regulation valve 46 is performed. Therefore, for example, the shutoff valve 40 can be kept open in step S1 shown in FIG. 2, and the shutoff valve 40 can be closed in step S5. Then, after filling of hydrogen ends, the supply of electric power from the low-voltage battery 62 to the low-voltage accessories 64 and the like ends.

In this embodiment, the shutoff valve 40, the flow regulation valve 46 and the like can be electrically operated even during filling of hydrogen to the vehicle 3, and the foregoing filling control can be appropriately performed. Incidentally, the timing of driving the shutoff valve 40 and the flow regulation valve 46 and stopping the driving thereof during the filling may also be controlled by the timer 70. For example, the start of supply of electric power to the shutoff valve 40 and the flow regulation valve 46 (i.e., the driving of these valves) and the end of the supply (i.e., the stop of the driving of these valves) may be controlled by the timer 70 so that the supply of electric power to the shutoff valve 40 and the flow regulation valve 46 continues for a predetermined time (e.g., 30 minutes) after the operation of connecting the filling nozzle 23 to the receptacle 32, or after the fuel cover of the lidded box of the vehicle 3 has been opened.

The vehicles of the embodiments and their modifications are applicable to vehicles that have gas tanks that are supplied with not only hydrogen gas but also other fuel gasses, such as natural gas or the like. Besides, the invention is applicable not only to wheeled vehicles but also to other mobile units equipped with fuel tanks as an object of the filling of a gas from outside, such as aircrafts, ships and boats, robots, etc.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A vehicle comprising:
    a first gas tank that has a first heat dissipation rate;
    a second gas tank that has a second heat dissipation rate that is lower than the first heat dissipation rate;
    a common channel as a supply passageway of a gas that is supplied from an external gas station to the first and second gas tanks; and
    a first branch channel and a second branch channel that branch from the common channel to the first and second gas tanks, respectively, at a bifurcation point of the common channel,
    wherein no switch valve is provided at the bifurcation point of the common channel,
    wherein the first branch channel is provided with a first flow restriction mechanism that is located between an end of the common channel and the first gas tank, controlled by a vehicle-side controller, and capable of restricting the amount of the gas supplied to the first gas tank,
    wherein no flow restriction mechanism controlled by the vehicle-side controller and capable of restricting the amount of the gas supplied to the second gas tank is provided between the bifurcation point and an interior of the second gas tank.

2. The vehicle according to claim 1, wherein the first flow restriction mechanism is a shutoff valve.

3. The vehicle according to claim 2, wherein the vehicle-side controller controls opening and closing of the shutoff valve,
    wherein if a user designates a filling amount or a budget for filling when the gas is supplied from the gas station into the vehicle, the vehicle-side controller calculates states of filling of the first and second gas tanks that correspond to the filling amount or the budget for filling, and
    wherein the vehicle-side controller permits the gas to be supplied to the first and second gas tanks so that filling of the first and second gas tanks is performed according to the calculated states of filling.

4. The vehicle according to claim 2, wherein timing at which the shutoff valve is operated and stopped is controlled by timing means.

5. The vehicle according to claim 1, wherein the first flow restriction mechanism is a flow regulation valve.

6. The vehicle according to claim 5, wherein the vehicle-side controller controls the opening degree of the flow regulation valve,
wherein the vehicle-side controller controls the opening degree of the flow regulation valve so that the states of filling in the first and second gas tanks are equal to each other while the gas is supplied from the gas station.

7. The vehicle according to claim 6, wherein timing at which the flow regulation valve is operated and stopped is controlled by timing means.

8. The vehicle according to claim 5, wherein the flow regulation valve is a mechanical valve whose opening degree is controlled so that states of filling of the first and second gas tanks are equal to each other while the gas is supplied from the gas station.

9. The vehicle according to claim 1 further comprising:
a fuel cell that generates electricity using the gas filled in the first and second gas tanks; and
a battery that stores the electricity generated in the fuel cell,
wherein the first flow restriction mechanism is operated by using the electricity stored in the battery when the gas is filled into the gas tanks.

10. A vehicle comprising:
a first gas tank that has a first heat dissipation rate;
a second gas tank that has a second heat dissipation rate that is lower than the first heat dissipation rate;
a common channel as a supply passageway of a gas that is supplied from an external gas station to the first and second gas tanks; and
a first branch channel and a second branch channel that branch from the common channel to the first and second gas tanks, respectively, at a bifurcation point of the common channel,
wherein no switch valve is provided at the bifurcation point of the common channel,
wherein the first branch channel is provided with a first shutoff valve that is located between an end of the common channel and the first gas tank, controlled by a vehicle-side controller, and capable of restricting the amount of the gas supplied to the first gas tank,
wherein the vehicle-side controller is programmed to control opening and closing of the first shutoff valve,
wherein when the vehicle is supplied with the gas from the gas station, the vehicle-side controller permits the gas to be supplied to the first and second gas tanks while the first shutoff valve is opened, and then, after the supply of a predetermined amount of gas to the first gas tank is completed, the vehicle-side controller closes the first shutoff valve to permit the gas to be supplied only to the second gas tank among the first and second gas tanks,
wherein no flow restriction mechanism controlled by the vehicle-side controller and capable of restricting the amount of the gas supplied to the second gas tank is provided between the bifurcation point and an interior of the second gas tank.

11. The vehicle according to claim 10, further comprising a first detector that detects a state quantity regarding an interior of the first gas tank;
wherein the vehicle-side controller uses information detected by the first detector as an index for determining whether or not the supply of the predetermined amount of gas has been completed.

12. The vehicle according to claim 11, further comprising a transmitter that transfers information detected by the first detector to a receiver that is provided at the gas station by communication.

13. The vehicle according to claim 12, further comprising a second detector that detects a state quantity regarding the interior of the second gas tank,
wherein the transmitter also transfers information detected by the second detector to the receiver by communication.

* * * * *